United States Patent [19]

Klöpfer

[11] Patent Number: 5,407,012
[45] Date of Patent: Apr. 18, 1995

[54] PORTABLE HANDHELD EDGE CUTTER

[75] Inventor: Karl-Heinz Klöpfer, Winnenden, Germany

[73] Assignee: Andreas Stihl, Waiblingen, Germany

[21] Appl. No.: 81,128

[22] Filed: Jun. 25, 1993

[30] Foreign Application Priority Data

Jul. 18, 1992 [DE] Germany .................. 42 23 764.5

[51] Int. Cl.⁶ ............................................. A01D 53/14
[52] U.S. Cl. ................................. 172/15; 172/17; 172/517; 172/776
[58] Field of Search ............. 172/13, 15, 16, 17, 172/126, 517, 776

[56] References Cited

U.S. PATENT DOCUMENTS

| | | | |
|---|---|---|---|
| 2,686,364 | 8/1954 | Arnoldy | 172/15 X |
| 3,319,365 | 5/1967 | Perry et al. | 172/15 X |
| 3,338,314 | 8/1967 | Meltzer | 172/15 |
| 3,357,497 | 12/1967 | Simolka | 172/16 |
| 3,907,040 | 9/1975 | Trusty | 172/17 X |
| 3,943,998 | 3/1976 | Flemming | 172/17 |
| 3,946,815 | 3/1976 | Ajdukovic | 172/17 |
| 4,312,178 | 1/1982 | Callahan | 172/15 X |
| 4,326,370 | 4/1982 | Thorud | 56/202 |
| 4,361,000 | 11/1982 | Friberg | 56/13.4 |
| 4,463,544 | 8/1984 | Carsello et al. | 172/17 X |
| 4,932,194 | 6/1990 | Allen | 56/320.2 |
| 4,962,631 | 10/1990 | Braun et al. | 172/15 X |
| 5,101,617 | 4/1992 | Hare et al. | 56/17.4 |
| 5,156,218 | 10/1992 | Metzler et al. | 172/13 X |

Primary Examiner—David H. Corbin
Assistant Examiner—Christopher J. Novosad
Attorney, Agent, or Firm—Walter Ottesen

[57] ABSTRACT

The invention is directed to a portable handheld edge cutter and especially an edge cutter for maintaining the edges of a lawn. The edge cutter includes a drive motor and a rotating knife as well as a drive shaft between the motor and the knife. The knife end of the drive shaft is mounted in a support which is structurally part of the housing. The housing overlaps the knife at a predetermined region. A wheel or roller supports the housing on the ground. A projection is provided on the housing which indicates to the operator the precise direction in which the rotating knife is moved and so acts as a direction device for the operator.

18 Claims, 6 Drawing Sheets

PORTABLE HANDHELD EDGE CUTTER

BACKGROUND OF THE INVENTION

Portable handheld edge cutters are known and essentially comprise a drive motor, a rotating knife and a drive shaft between the motor and the knife. The knife end of the drive shaft is received in a support which is structurally part of a housing overlapping the knife. The housing covers the knife over a specific angle of the peripheral path A wheel is journalled on the housing so that the edge cutter can be guided rolling on the ground.

The housing covers the knife precisely in that angular range which faces toward the operator. For this reason, the exact position of the knife cannot be recognized so that a precise cut edge cannot be made spontaneously. A further disadvantage with respect to the known arrangement is that the wheel always is mounted at a specific location and therefore the particular advantageous conditions of the different lawn edges cannot be considered. The rapid rotation of the knife during work with the portable handheld edge cutter causes small stones, grains of sand and pieces of vegetation and the like to be flung away. The direction in which this debris is flung is toward the operator because of the rotational direction of the knife.

SUMMARY OF THE INVENTION

It is an object of the invention to provide a portable handheld edge cutter which is configured so that the manipulability thereof is enhanced.

The portable handheld edge cutter of the invention is for cutting vegetation such as a lawn edge and the like and includes: a drive motor; a drive shaft having a first end connected to the drive motor and a second end; a rotatable knife for cutting the vegetation; the knife being connected to the second end of the drive shaft so as to be driven by the drive motor via the drive shaft; the knife defining a rotation plane in which the knife rotates in a rotation circle; a housing overlapping the knife over a predetermined angle of the rotation circle; the housing having a support for accommodating the second end therein; wheel means rotatably journalled on the housing for facilitating rolling the housing over the ground at a predetermined elevation thereabove thereby moving the rotating knife in a given direction; and, directional guide means on the housing for indicating precisely the direction in which the rotating knife is moved by an operator of the edge cutter.

The means provided on the housing indicates the direction in which the rotating knife moves. Accordingly, the operator can precisely target the edge to be cut and guide the knife precisely along the desired line. In this way, a precise edge is obtained already with the first cutting operation so that rework or recutting is superfluous.

According to a preferred embodiment of the invention, the above-mentioned means comprises a narrow projection which is elevated above the outer wall surface of the housing and is in the same radial plane as the rotating knife. Such a directional guide is suitable for aligning the knife with target precision notwithstanding its simple configuration. This projection can extend almost over the entire arcuate distance of the housing. However, the projection must at least be disposed in the section of the housing forward in the direction of movement of the edge cutter. An especially advantageous embodiment is provided in that the housing comprises two cast parts for which the connecting line or partition plane extends in the longitudinal direction of the housing with the projection being cast onto the housing and extending along the above-mentioned connecting line. In this way, the housing can be produced by simple injection cast forms and no additional parts are necessary for the projection since the projection is formed on the housing parts by injection without additional effort.

A further useful embodiment is provided by journalling the wheel on a lug attached to the housing and by securing the wheel on the lug by means of an attachment device. This lug can be selectively mounted on both sides of the housing so that the wheel or roller can be mounted with reference to the longitudinal direction of the housing and therefore make it possible for the operator to have the most favorable operating conditions for the particular edge to be worked. For this purpose, two bores are provided in the housing in different planes. The lug can be seated in these bores and wheels or rollers of different diameters are mounted on the lug. If the lug is in the lower bore, then a wheel having a smaller diameter but a larger axial width is used than for the lug positioned in the upper bore.

Furthermore, it is also possible to mount a wheel on both sides of the housing simultaneously. In this case, the lugs are placed at the same elevation and wheels having the same diameter are mounted.

As a further alternative, a roller can be used in lieu of two wheels with this roller being below the housing and extending on both sides thereof. For a rapid exchange, the bearing lugs and/or wheels can be attached with snap or insert holding means.

A flat deflector is arranged at the rearward portion of the housing so as to extend therefrom to protect the operator against particles flung by the knife. This deflector preferably comprises a rubber flap. The deflector is accommodated with its forward edge in a slot of the housing and is attached to the housing by means of at least one screw. The rubber flap is held securely in its position with reference to its longitudinal direction by additionally providing a fixing pin on the housing which engages an opening of the hard rubber flap. The flap is so configured that it can at any time be also mounted in a mirror-image manner.

BRIEF DESCRIPTION OF THE DRAWINGS

The invention will now be described with reference to the drawings wherein:

FIG. 3a is section view of a portion of the housing taken along line III—III of FIG. 3;

DESCRIPTION OF THE PREFERRED EMBODIMENTS OF THE INVENTION

Figure 1:
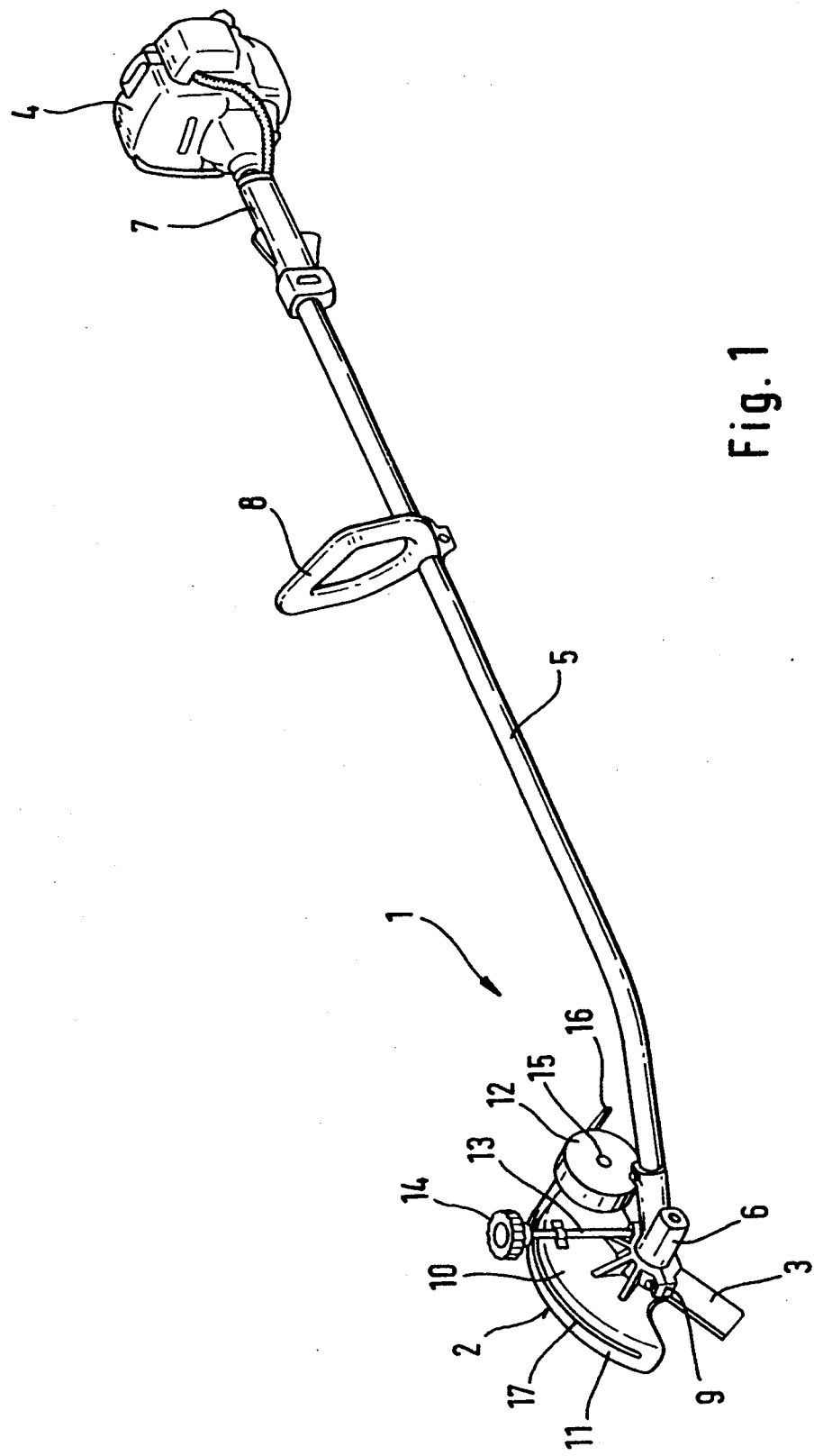
FIG. 1 is a perspective view of a portable handheld edge cutter according to the invention.

In FIG. 1, an edge cutter 1 is shown which essentially has a knife 3 rotatably journalled in a housing 2, a drive motor 4 and a drive shaft. The drive shaft is journalled in a tube 5 connecting the housing 2 to the drive motor 4. The knife end of the drive shaft is guided in a transmission 6 flange-connected to the housing 2. The rotating knife 3 is attached to a drive shaft of the transmission 6. The end of the tube 5 next to the drive motor 4 is configured as a handle 7. A handle 8 is attached somewhat below handle 7 to enable the operator to guide the edge cutter with the other hand.

The housing 2 has essentially the configuration of a circular sector 10 extending in the radial direction. The peripheral edge is bent over approximately at right angles to define a cylindrical flange wall 11. The side of the flange wall lying remotely from the circular sector 10 is again bent over and is directed radially inwardly so that the housing 2 overlaps the rotating knife 3 over a predetermined angle. This arrangement functions on the one hand to protect against injury and, on the other hand, the flinging of cuttings in this region is prevented. The circular center of the circular sector 10 is configured as a flange or clamping device 9 for the transmission 6. The clamping device 9 is adjustable or releasable by means of a bolt 13 threadably engageable in a winding of the clamping device. The bolt 13 has a hand wheel 14 at the upper end thereof. The wheel 12 is located laterally of the housing 2 and a deflector 16 extends as an extension of the housing.

A wheel 12 is provided at the rearward end of the housing 2 directed toward the drive motor 4. The wheel 12 is journalled on a lug 15 projecting from the housing 2. The wheel 12 operates to roll the edge cutter 1 along an edge to be trimmed. The wheel does not determine the direction but only the elevation at which the edge cutter 1 is guided. A narrow radial projection 17 is provided on the surface of the flange wall 11 so that the direction in which the edge cutter 1 is moved can be precisely recognized and the apparatus appropriately guided. The radial projection 17 operates as a directional guide for the operator. This projection 17 is located in the same radial plane as the knife 3 so that the direction of the projection 17 is simultaneously the direction of the knife 3.

Figure 2:
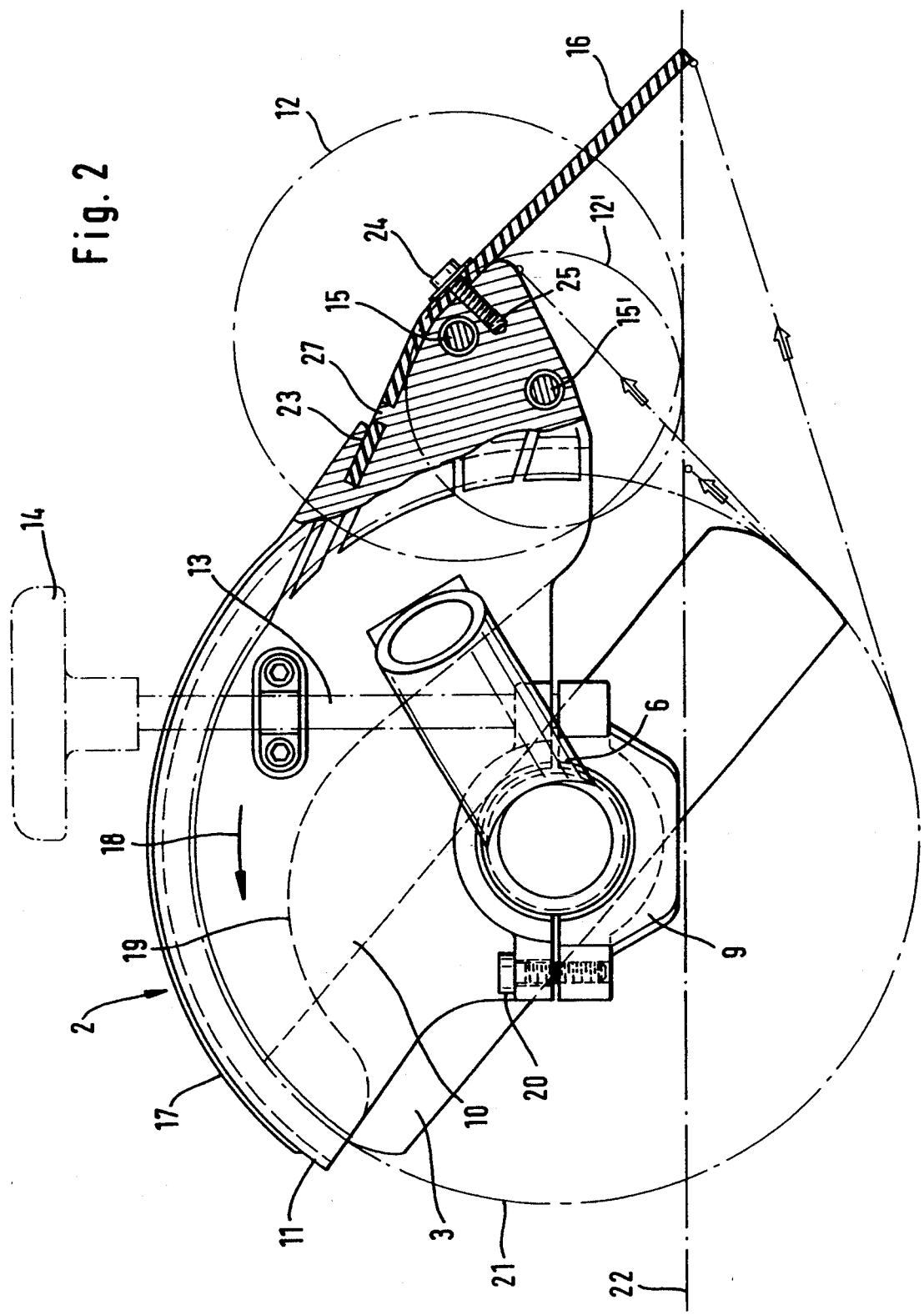
FIG. 2 is a side elevation view, partially in section, of the housing in which the knife is rotatably journalled.

FIG. 2 shows the housing 2 with a wall portion in the form of a circular sector 10 and the clamping device 9 with the transmission 6. The clamping device 9 is located at the circular center. The clamping device 9 is held by means of a screw 20 at one side of the housing. The bolt 13 with the hand wheel 14 at its upper end is located at the other side of the housing. The radial limit of the housing 2 is defined by the flange wall 11 on the other side of which a section 19 extends which likewise runs in the radial direction and the contour of which is shown in phantom outline. An arrow 18 is provided on the circular sector 10 for marking the direction of rotation of the knife 3. The housing 2 overlaps the circle 21 of rotation of the knife 3 by an angle of approximately 145° because of the configuration of the housing.

FIG. 2 shows that the radial projection 17 extends over a long section of the flange wall 11 and up to close to the forward edge of the housing 2 and rearwardly over at least a portion of an arcuate dimension of the flange wall 11. The lugs 15 and 15' are located at the rearward end of the housing 2 shown in section. The lugs 15 or 15' are arranged at different spacings relative to the reference plane 22 and are provided for journalling wheels 12 and 12', respectively. The lug 15 is provided for wheels 12 having a larger diameter and the lug 15' is provided for wheels 12' of lesser diameter. In both cases, the housing assumes the same position with respect to the reference plane 22 which, for example, can be a walkway in a garden.

The deflector 16 is held in a slot 23 at the rearward region of the housing 2. The deflector 16 is a flexible flap preferably made of hard rubber. A screw 24 is provided for attaching the deflector 16 and threadably engages a threaded bore 25 of the housing. Furthermore, a fixing pin 27 is formed on the housing 2 and engages in a corresponding through opening in the deflector 16 and thus secures the position of the deflector 16 relative to its longitudinal direction. The deflector operates to prevent bodies (for example small stones and the like), which are struck by the knife and flung away, from being thrown in the direction of the operator. The deflector 16 can be mounted in a mirror-image manner in a simple manner.

Figure 3:
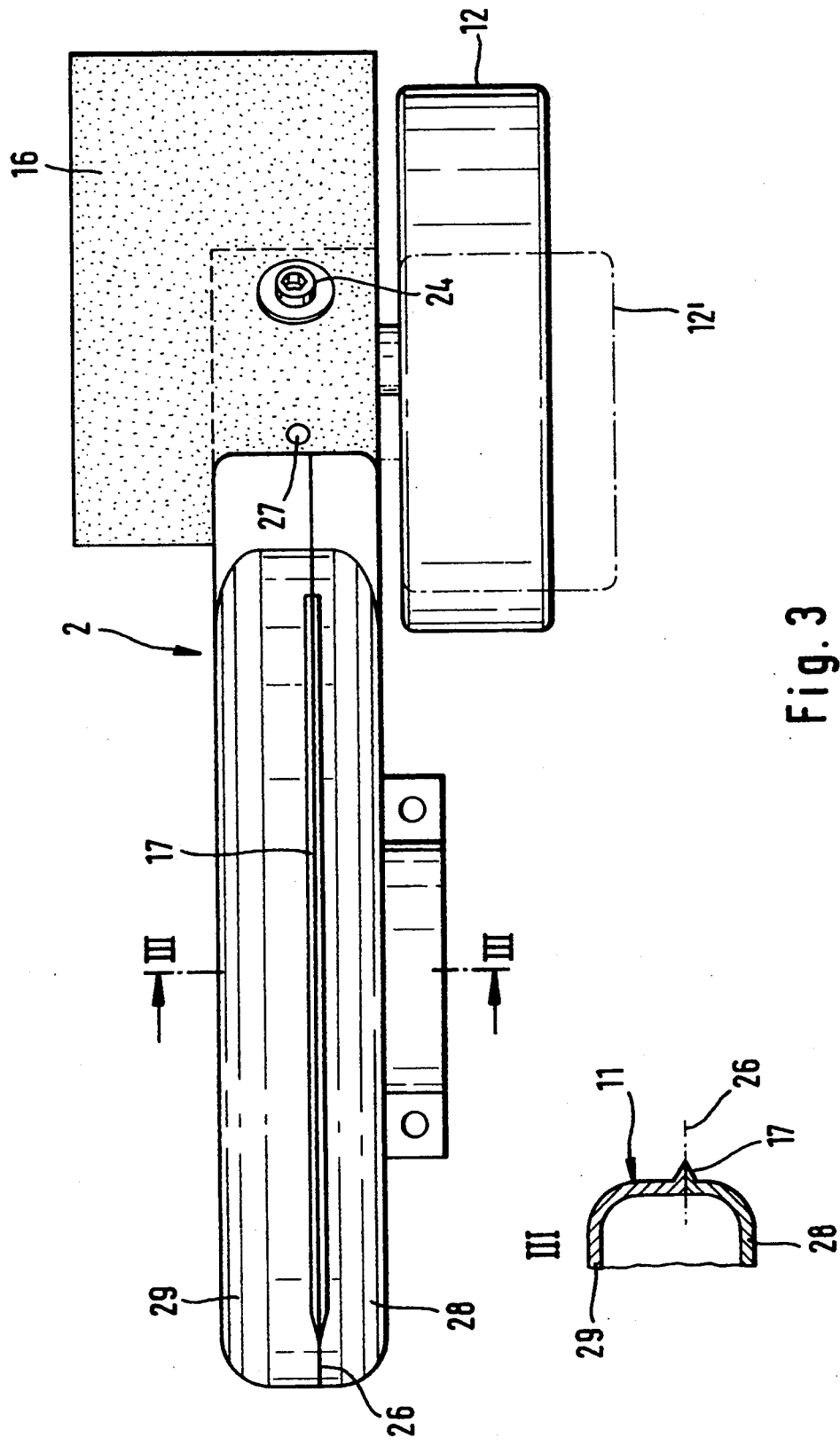
FIG. 3 is a plan view of the housing with a wheel mounted on the left.

FIG. 3 shows a plan view of the unit comprising the housing 2, deflector 16 and wheel 12. The housing 2 has a predetermined width and the flat deflector 16 has a width corresponding at least to the predetermined width of the housing. The housing 2 comprises two parts 28 and 29 and is preferably made of a light metal casting. The partition plane 26 extends in the longitudinal direction of the housing and lies in the radial plane of the knife. The section view in FIG. 3a clearly shows that the radial outer ends of the two parts 28 and 29 define the flange wall 11.

The two parts 28 and 29 have radial formations formed thereon at their connecting surfaces and therefore at the partition plane 26. These formations conjointly define the radial projection 17 after the parts 28 and 29 are joined preferably by welding. The projection 17 lies in the same radial plane as the knife because of the partition plane. The housing 2 is preferably cast as one piece with the projection 17 again being disposed in the rotational plane of the knife.

The deflector 16 is mounted at the right side of the housing 2 as shown in FIG. 3 and the fixing pin 27 engages into the deflector 16. The deflector 16 is attached by means of the screw 24. The deflector 16 is arranged asymmetrically with the side edge thereof extending close to the wheel 12 located on the left side in the longitudinal direction. On the other side, the deflector extends laterally of the housing 2. In lieu of the wheel 12, the wheel 12' shown in phantom outline can be provided which has a smaller diameter but a larger axial width.

Figure 4:
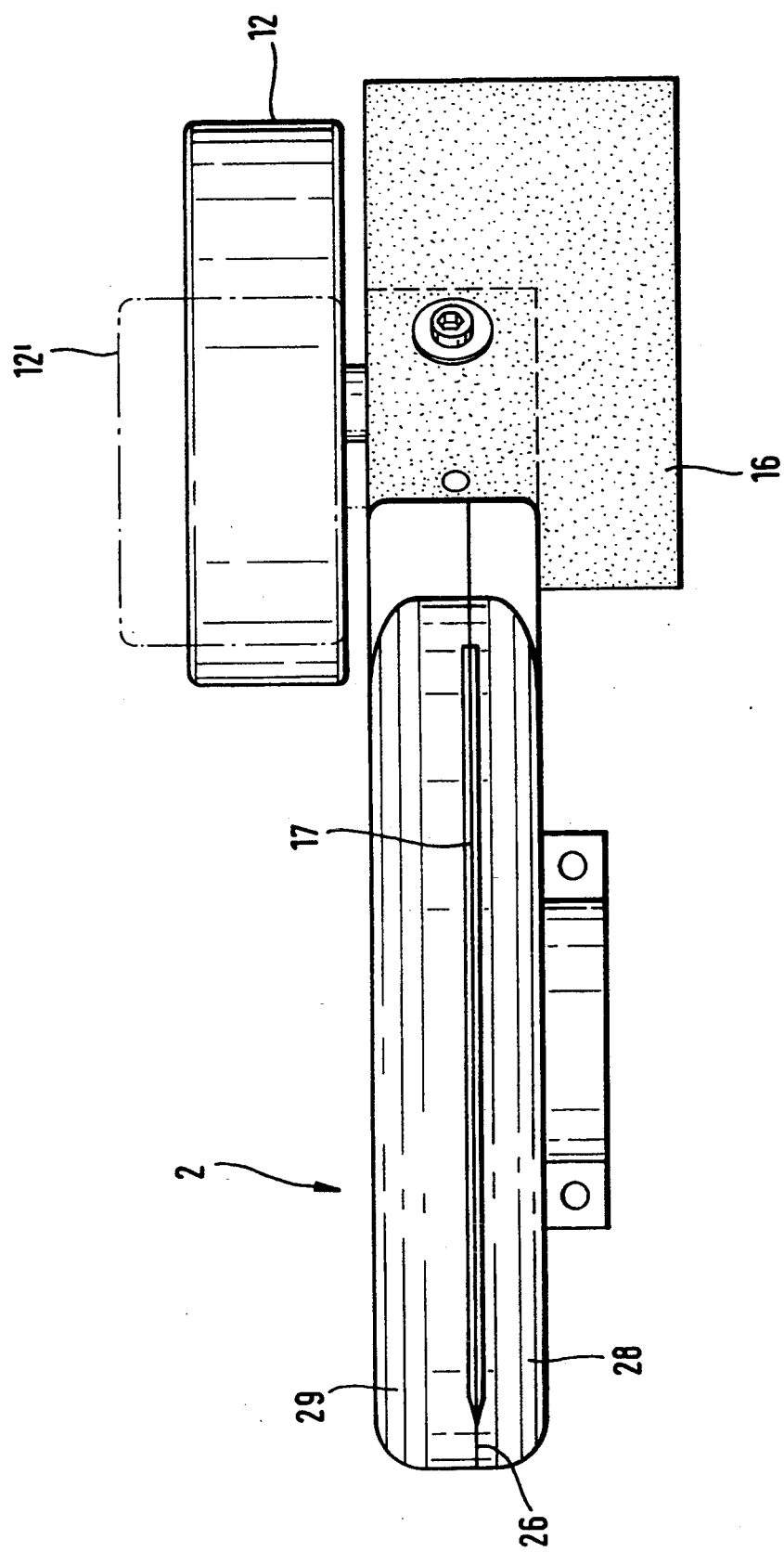
FIG. 4 is a plan view of the housing showing the wheel mounted on the right.

In FIG. 4, the housing 2 is likewise shown in a plan view but with the wheel 12 mounted on the right side in the longitudinal direction of the housing 2. Accordingly, the deflector 16 is reversed and projects beyond the housing edge on the left side thereof. This selective arrangement of the wheel 12 either left or right enables the operator to take into consideration the particular conditions of the edge to be cut and the strip next thereto in accordance with its characteristics and thereby achieve optimal working conditions.

Figure 5:
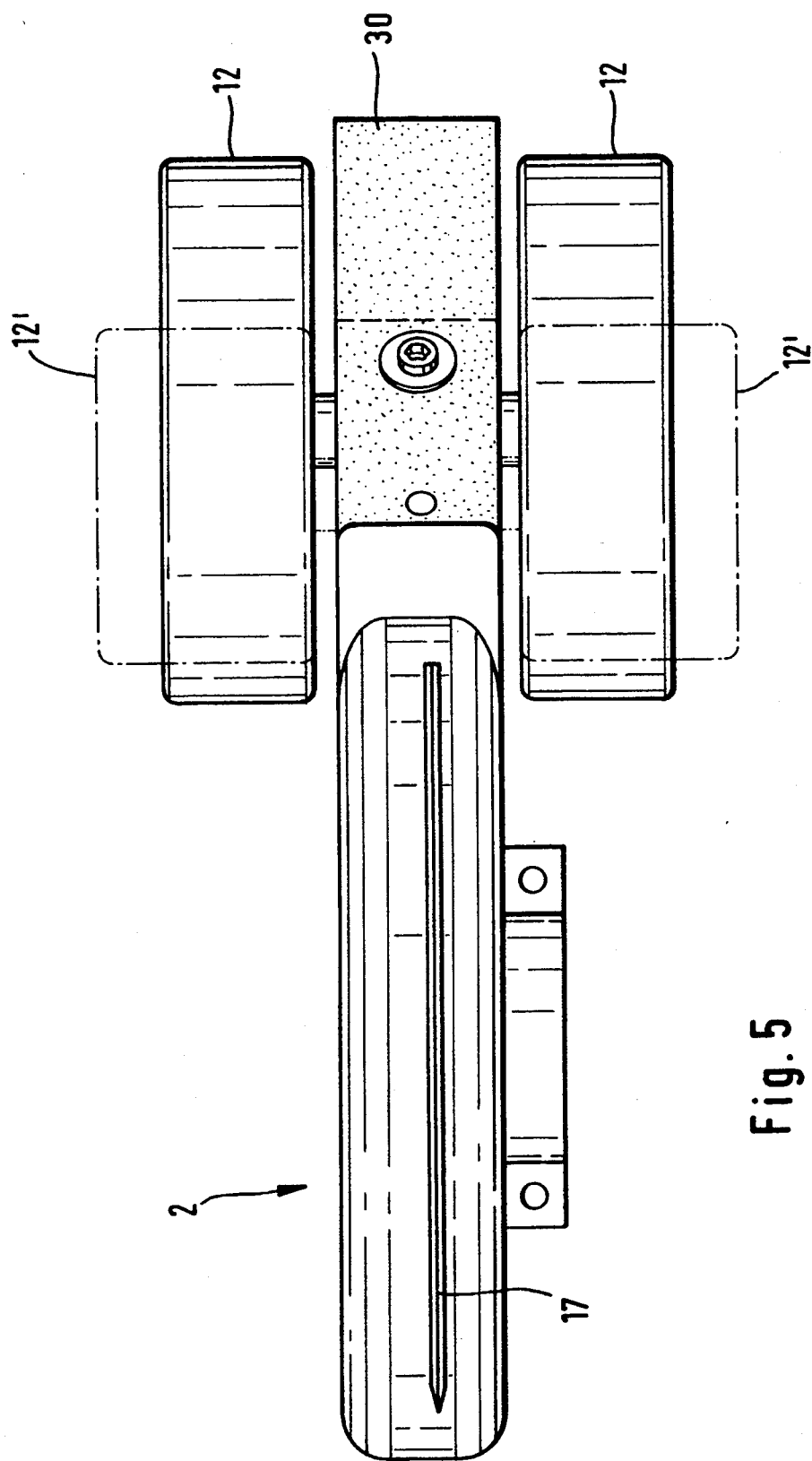
FIG. 5 is a view corresponding to that of FIG. 4 but with wheels mounted on both sides of the housing; and, FIG. 6 is another embodiment of the invention wherein a single roller is mounted below the housing so as to extend outwardly from both sides thereof.

FIG. 5 shows a variation wherein a wheel 12 is mounted on both sides of the housing 2. In this case, the width of a deflector 30 is adapted to the spacing of the wheels 12. This embodiment is possible also with the wheels 12' having the smaller diameter.

Figure 6:
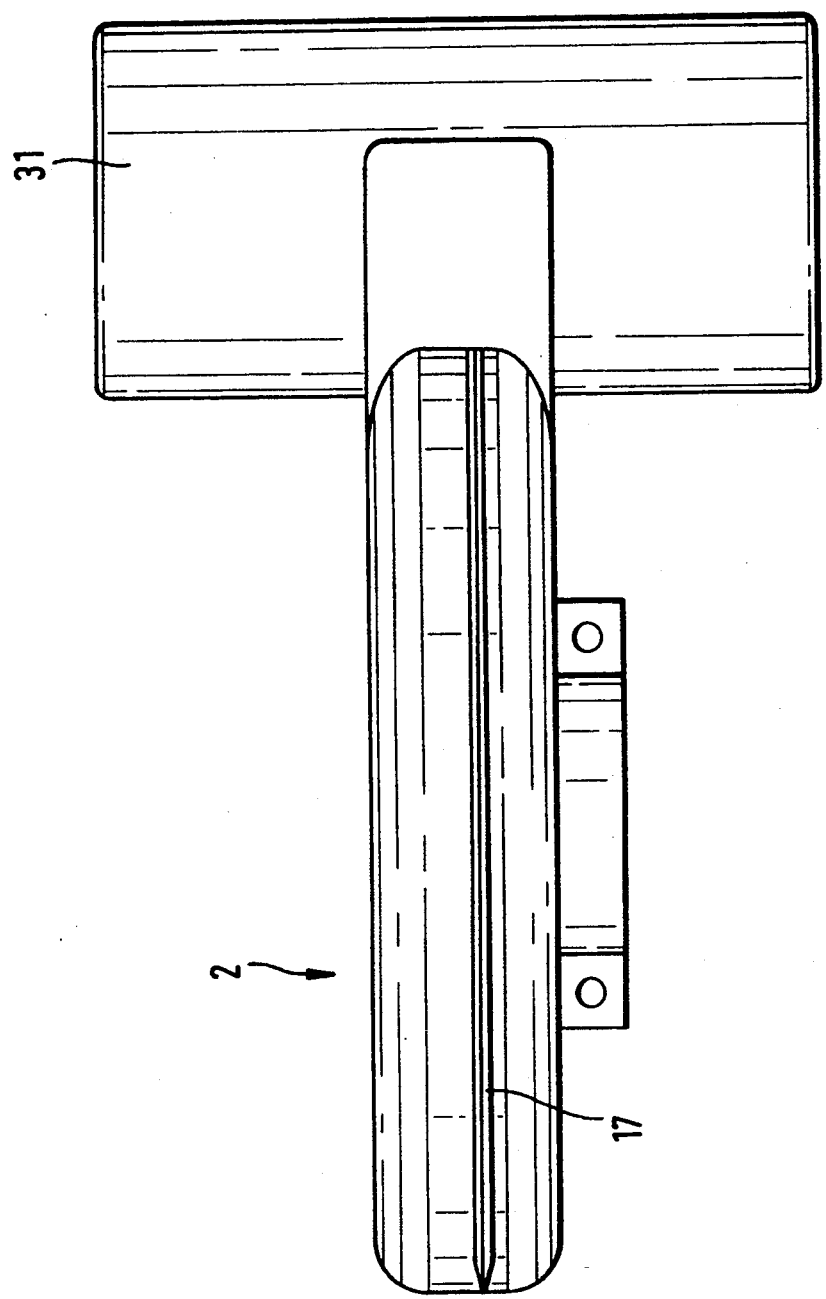

A further embodiment is shown in FIG. 6 wherein a roller 31 is provided in lieu of the wheels. A deflector is not necessary in this embodiment. The roller 31, because of its width, prevents particles from being flung in the direction of the operator.

It is understood that the foregoing description is that of the preferred embodiments of the invention and that various changes and modifications may be made thereto without departing from the spirit and scope of the invention as defined in the appended claims.

What is claimed is:

1. A portable handheld edge cutter for cutting vegetation, the portable handheld edge cutter comprising:
   a drive motor;
   a drive shaft having a first end connected to said drive motor and having a second end;
   a rotatable knife for cutting the vegetation;
   said knife being connected to said second end so as to be driven by said drive motor via said drive shaft;
   said knife defining a rotation plane in which said knife rotates in a rotation circle;
   a housing overlapping said knife over a predetermined angle of said rotation circle;
   said housing having a support for accommodating said second end therein;
   said housing having a side wall and a peripheral wall extending outwardly from said side wall transversely to said rotation plane to overlap said rotating knife; said peripheral wall defining an outer wall surface;
   wheel means rotatably journalled on said housing for facilitating rolling said housing over the ground at a predetermined elevation thereabove thereby moving the rotating knife in a given direction;
   directional guide means on said housing for indicating precisely the direction in which said rotating knife is moved by an operator of the edge cutter;
   said directional guide means being a narrow projection extending upwardly from said outer wall surface in said rotation plane;
   said peripheral wall having a forward edge and having an arcuate dimension in said rotation plane subtending said predetermined angle; and,
   said projection extending almost to said forward edge and rearwardly over at least a portion of said arcuate dimension of said peripheral wall.

2. The edge cutter of claim 1, said housing being formed as a single integral piece.

3. The edge cutter of claim 1, said housing being formed as a single integral casting.

4. The edge cutter of claim 1, further comprising a bearing lug attached to said housing; and, said wheel means being rotatably journalled on said bearing lug.

5. The edge cutter of claim 1, said housing having a rearward end and said edge cutter further comprising a flat deflector extending from said rearward end.

6. The edge cutter of claim 5, said flat deflector being a flexible flap.

7. The edge cutter of claim 6, said flexible flap being made of hard rubber.

8. The edge cutter of claim 5, said housing having a predetermined width and said flat deflector having a width corresponding at least to said predetermined width of said housing.

9. A portable handheld edge cutter for cutting vegetation, the portable handheld edge cutter comprising:
   a drive motor;
   a drive shaft having a first end connected to said drive motor and having a second end;
   a rotatable knife for cutting the vegetation;
   said knife being connected to said second end so as to be driven by said drive motor via said drive shaft;
   said knife defining a rotation plane in which said knife rotates in a rotation circle;
   a housing overlapping said knife over a predetermined angle of said rotation circle;
   said housing having support for accommodating said second end therein;
   said housing having a side wall and a peripheral wall extending outwardly from said side wall transversely to said rotation plane to overlap said rotating knife; said peripheral wall defining an outer wall surface;
   wheel means rotatably journalled on said housing for facilitating rolling said housing over the ground at a predetermined elevation thereabove thereby moving the rotating knife in a given direction;
   directional guide means on said housing for indicating precisely the direction in which said rotating knife is moved by an operator of the edge cutter;
   said directional guide means being a narrow projection extending upwardly from said outer wall surface in said rotation plane;
   said peripheral wall having an arcuate dimension in said rotation plane subtending said predetermined angle; and,
   said projection extending over almost the entire arcuate dimension of said peripheral wall.

10. The edge cutter of claim 9, said housing extending in a longitudinal direction parallel to said rotation plane; and, said housing comprising two cast parts conjointly defining a partition interface plane at which said parts join each other along a joining line; said partition interface plane extending in said longitudinal direction; and, said projection being cast as integral portions of said parts and extending along said joining line.

11. A portable handheld edge cutter for cutting vegetation, the portable handheld edge cutter comprising:
   a drive motor;
   a drive shaft having a first end connected to said drive motor and having a second end;
   a rotatable knife for cutting the vegetation;
   said knife being connected to said second end so as to be driven by said drive motor via said drive shaft;
   said knife defining a rotation plane in which said knife rotates in a rotation circle;
   a housing overlapping said knife over a predetermined angle of said rotation circle;
   said housing having a support for accommodating said second end therein;
   wheel means rotatably journalled on said housing for facilitating rolling said housing over the ground at a predetermined elevation thereabove thereby moving the rotating knife in a given direction;
   directional guide means on said housing for indicating precisely the direction in which said rotating knife is moved by an operator of the edge cutter;
   a bearing lug attached to said housing;
   said wheel means being rotatably journalled on said bearing lug;
   two bores formed in said housing at respectively different elevations above the ground;
   said lug being adapted to be seated selectively in said bores; and, said wheel means including two wheels of different diameters which can be mounted selectively in dependence upon into which one of said bores said lug has been seated.

12. A portable handheld edge cutter for cutting vegetation, the portable handheld edge cutter comprising:

a drive motor;

a drive shaft having a first end connected to said drive motor and having a second end;

a rotatable knife for cutting the vegetation;

said knife being connected to said second end so as to be driven by said drive motor via said drive shaft;

said knife defining a rotation plane in which said knife rotates in a rotation circle;

a housing overlapping said knife over a predetermined angle of said rotation circle;

said housing having a support for accommodating said second end therein;

wheel means rotatably journalled on said housing for facilitating rolling said housing over the ground at a predetermined elevation thereabove thereby moving the rotating knife in a given direction;

directional guide means on said housing for indicating precisely the direction in which said rotating knife is moved by an operator of the edge cutter;

a bearing lug attached to said housing;

said wheel means being rotatably journalled on said bearing lug;

said housing extending in a longitudinal direction parallel to said rotation plane; and, said wheel means being selectively rotatably journalled on either of the sides of said housing to rotate in said longitudinal direction.

13. The edge cutter of claim 12, said housing having a rearward end and said edge cutter further comprising a flat deflector extending from said rearward end on the one side of said housing on which said wheel means is journalled and in spaced relationship to said wheel means; and, said flat deflector also projecting beyond the other side of said housing.

14. A portable handheld edge cutter for cutting vegetation, the portable handheld edge cutter comprising:

a drive motor;

a drive shaft having a first end connected to said drive motor and having a second end;

a rotatable knife for cutting the vegetation;

said knife being connected to said second end so as to be driven by said drive motor via said drive shaft;

said knife defining a rotation plane in which said knife rotates in a rotation circle;

a housing overlapping said knife over a predetermined angle of said rotation circle;

said housing having a support for accommodating said second end therein;

wheel means rotatably journalled on said housing for facilitating rolling said housing over the ground at a predetermined elevation thereabove thereby moving the rotating knife in a given direction;

directional guide means on said housing for indicating precisely the direction in which said rotating knife is moved by an operator of the edge cutter;

two bearing lugs attached to said housing on respective sides thereof to define a common axis transverse to said rotation plane; and, said wheel means including two wheels of equal diameter rotatably journalled on corresponding ones of said bearing lugs.

15. A portable handheld edge cutter for cutting vegetation, the portable handheld edge cutter comprising:

a drive motor;

a drive shaft having a first end connected to said drive motor and having a second end;

a rotatable knife for cutting the vegetation;

said knife being connected to said second end so as to be driven by said drive motor via said drive shaft;

said knife defining a rotation plane in which said knife rotates in a rotation circle;

a housing overlapping said knife over a predetermined angle of said rotation circle;

said housing having a support for accommodating said second end therein;

wheel means rotatably journalled on said housing for facilitating rolling said housing over the ground at a predetermined elevation thereabove thereby moving the rotating directional guide means on said housing for indicating knife in a given direction;

directional guide means on said housing for indicating precisely the direction in which said rotating knife is moved by an operator of the edge cutter;

a bearing lug attached to said housing;

said wheel means being rotatably journalled on said bearing lug; and said wheel means being a roller which extends below said housing to both sides thereof.

16. A portable handheld edge cutter for cutting vegetation, the portable handheld edge cutter comprising:

a drive motor;

a driveshaft having a first end connected to said drive motor and having a second end;

a rotatable knife for cutting the vegetation;

said knife being connected to said second end so as to be driven by said drive motor via said drive shaft;

said knife defining a rotation plane in which said knife rotates in a rotation circle;

a housing overlapping said knife over a predetermined angle of said rotation circle;

said housing having a support for accommodating said second end therein;

wheel means rotatably journalled on said housing for facilitating rolling said housing over the ground at a predetermined elevation thereabove thereby moving the rotating knife in a given direction;

directional guide means on said housing for indicating precisely the direction in which said rotating knife is moved by an operator of the edge cutter;

said housing having a rearward end and said edge cutter further including a flat deflector extending from said rearward end; and said housing having a slot formed therein and said flat deflector being seated in said slot.

17. The edge cutter of claim 16, further comprising a threaded fastener for holding said flat deflector on said housing.

18. The edge cutter of claim 17, said flat deflector having an opening formed therein and said housing having a fixing pin which engages said opening.

* * * * *

UNITED STATES PATENT AND TRADEMARK OFFICE
CERTIFICATE OF CORRECTION

PATENT NO. : 5,407,012
DATED : April 18, 1995
INVENTOR(S) : Karl-Heinz Klöpfer

It is certified that error appears in the above-identified patent and that said Letters Patent is hereby corrected as shown below:

In column 1, line 11: between "path" and "A", insert -- . --.

In column 6, line 10: between "having" and "support", insert -- a --.

In column 8, line 21: delete "directional guide means on said housing for indicating".

In column 8, line 29: after "and", insert -- , --.

In column 8, line 31: delete "thereof," and substitute -- thereof. -- therefor.

In column 8, line 55: after "and", insert -- , --.

Signed and Sealed this

Thirteenth Day of June, 1995

Attest:

BRUCE LEHMAN

Attesting Officer

Commissioner of Patents and Trademarks